United States Patent Office 2,739,301
Patented Mar. 20, 1956

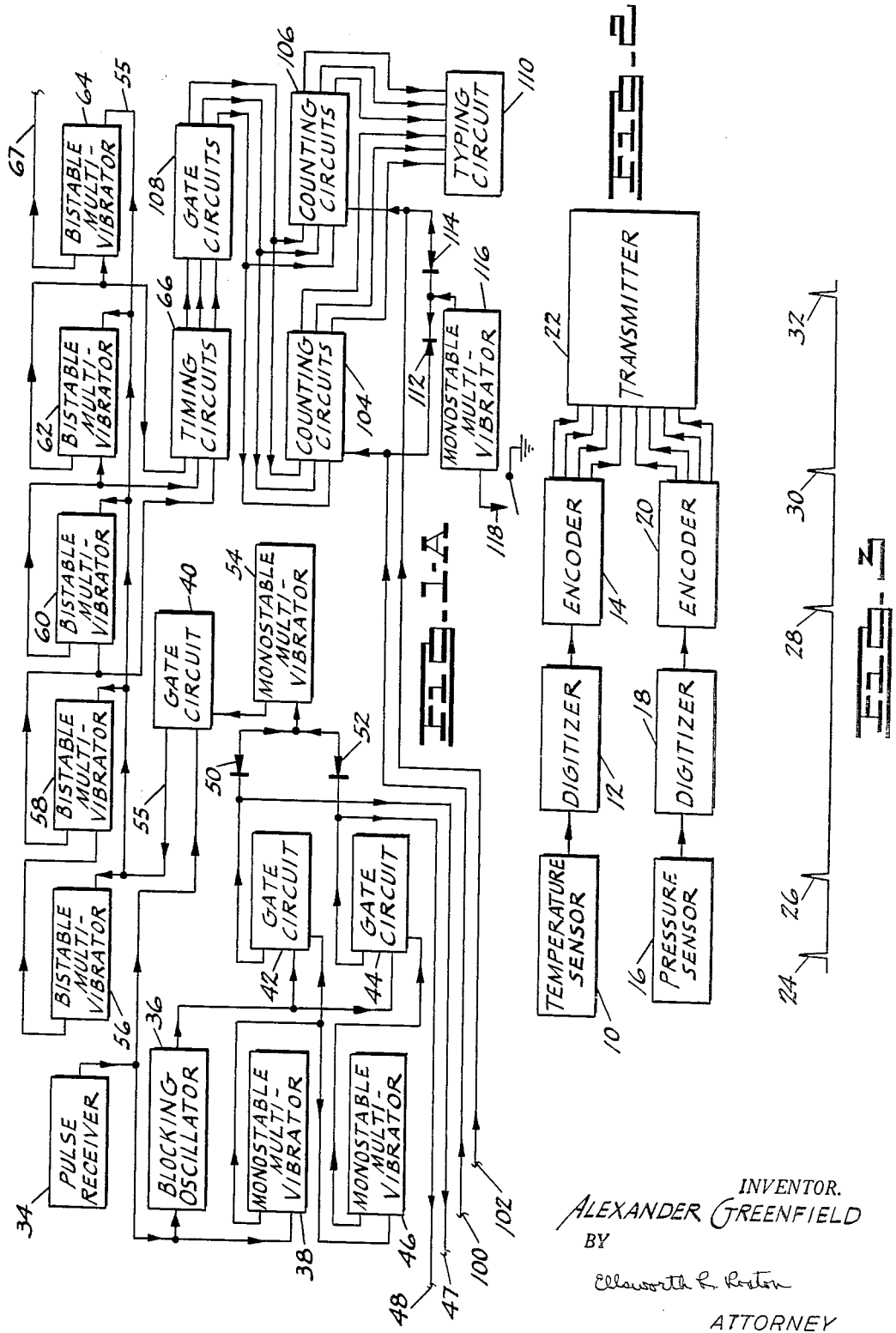

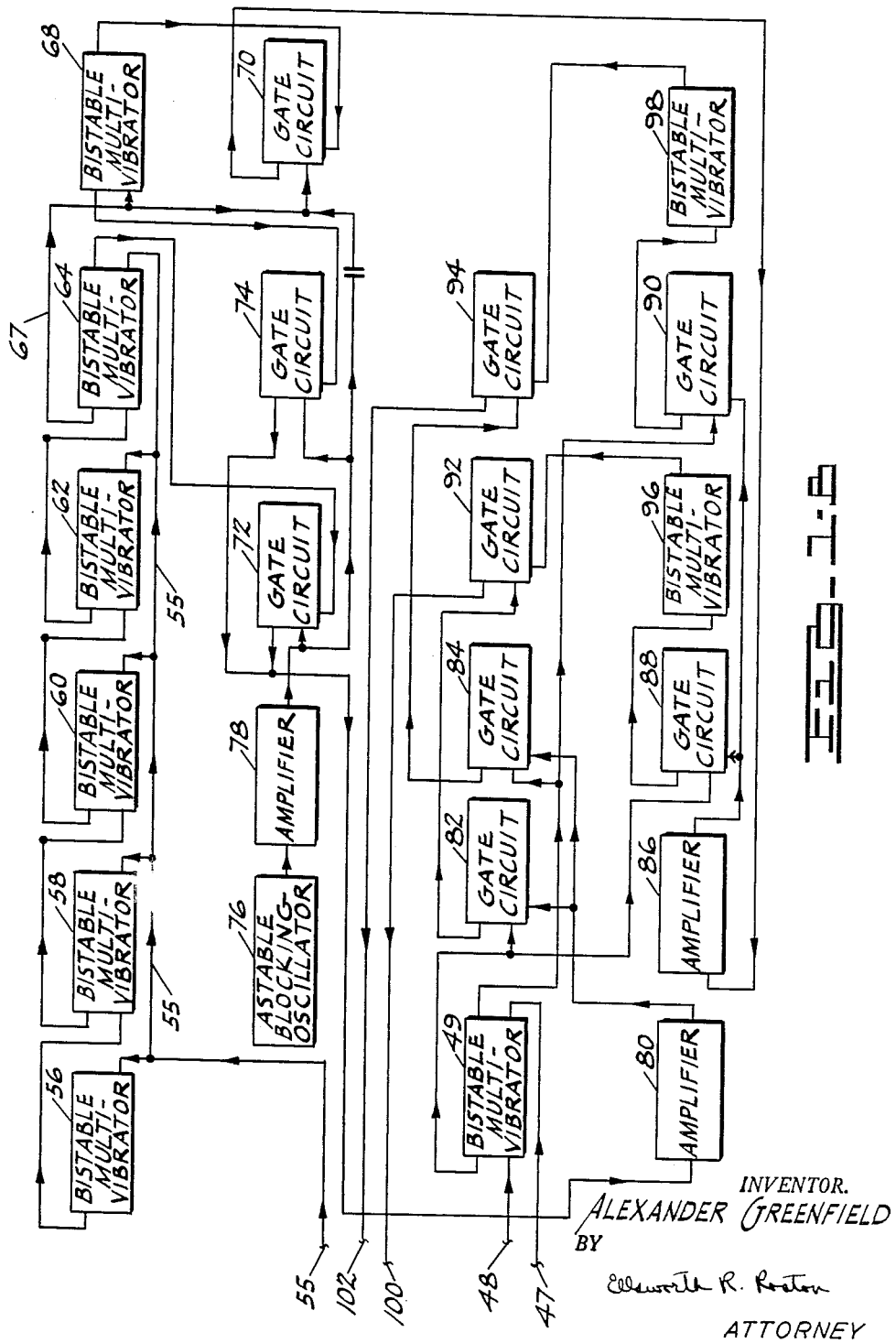

2,739,301

CHECKING CIRCUIT FOR CORRECT NUMBER OF RECEIVED INFORMATION PULSES

Alexander Greenfield, Detroit, Mich., assignor to Bendix Aviation Corporation, Detroit, Mich., a corporation of Delaware Application March 28, 1951, Serial No. 217,939

14 Claims. (Cl. 340—183)

This invention relates to a checking system and more particularly to a system for checking the number of code pulses sequentially received at a central station. The system is especially adapted to prevent any utilization of sequentially received code pulses, even after they have been decoded, unless the pulses actually received correspond to a predetermined number.

In the electronic art, a number of pulses are often sequentially transmitted to a central station for decoding, recording and analysis. The time periods between successive pulses in the sequence may represent, in coded form, information relating to a plurality of variable quantities or information relating to the values of successive digits in a single variable qantity. Sometimes, however, the pulses may be considerably weakened by the time they reach the central station, so that a plurality of pulses less than the predetermined number is received. At other times, interference from extraneous objects or signals from undesirable sources may cause additional pulses to be injected into the pulse sequence which is received at the central station. Since the accuracy of the decoded information is dependent upon the time periods between successive pulses, the reception of a plurality of pulses different from the predetermined number may cause the wrong information to be obtained.

This invention provides a system for counting the number of code pulses sequentially received at a central station, the time periods between successive pulses representing the values of the different digits in a variable quantity. Upon the reception of a plurality of signals different from a predetermined number, the system provides a signal for quenching the information represented by the pulses, so that a new sequence of pulses must be received before any recording can be made. When a plurality of pulses equal to the desired number is received, the system operates to prevent the formation of any quenching signal until after the information represented by the pulses has been recorded for subsequent analysis. The system operates to quench the information represented by one group of pulses and to pass the information represented by other groups when each group of pulses is indicative of a different variable quantity and when a plurality of pulses different from the desired number is received in the quenched group.

An object of the invention is to provide a system for determining the number of signals received at a ground station.

Another object of the invention is to provide a system of the above character for eliminating the information represented by a plurality of pulses when the number of pulses is different from a predetermined value.

A further object is to provide a system of the above character for operating, upon the reception of a predetermined number of pulses, to prevent any quenching signal from being produced until after the utilization of the information represented by the pulses.

Still another object is to provide a system of the above character for decoding the pulses in a sequence and for simultaneously checking the number of pulses in the sequence to determine whether the decoded information should be eliminated or utilized.

A still further object is to provide a system of the above character for operating on groups of pulses representing different variable quantities to quench any group of pulses composed of a number different from a predetermined value.

Other objects and advantages will be apparent from a detailed description of the invention and from the appended drawings and claims.

In the drawings:

Figures 1A and 1B are schematic diagrams, essentially in block form, which together constitute one embodiment of the invention;

Figure 2 is a simplified schematic diagram, essentially in block form, of a system to be used in conjunction with the embodiment shown in Figures 1A and 1B; and Figure 3 is a curve illustrating the time relationships between the different pulses in a typical sequence transmitted by the system shown in Figure 2.

The simplified system shown in Figure 2 is adapted to be used with the embodiment shown in Figures 1A and 1B. In Figure 2, a two-channel system is shown in which a temperature sensor 10, a digitizer 12 and an encoder 14 are connected in cascade arrangement in one channel and a pressure sensor 16, a digitizer 18 and an encoder 20 are provided in cascade arrangement in the other channel. A plurality of connections are made from output terminals in the encoders 14 and 20 to a transmitter 22.

The system shown in Figure 2 is similar to that disclosed in co-pending application Serial No. 183,717, filed September 8, 1950, by Charles A. Piper. The system may be housed in the head of a rocket which travels upwardly to a predetermined altitude after being launched. At the maximum altitude of the rocket, the head becomes detached from the body and floats slowly downwardly by parachute. The temperature sensor 10 and pressure sensor 16 operate constantly during the descent to determine the temperature and pressure of the surrounding atmosphere.

As disclosed in co-pending application Serial No. 183,717, filed September 8, 1950, by Charles A. Piper, the temperature measurement made by the decoder 10 is split by the digitizer 12 into separate digits and a plurality of voltages are produced which are proportional to the values of the different digits comprising the measurement. Upon alternate interrogatory pulses from a central station, as will be disclosed in detail hereinafter, the voltages are converted into a plurality of pulses in which the time period between each pair of sequential pulses is proportional to a different one of the voltages. For example, with a temperature measurement of 358° K. and with a time interval of 30 microseconds representing each integer in a digital value, four pulses spaced at time periods of 90, 150, and 240 microseconds may be produced. The first of these four pulses may in turn follow a coloring pulse by a predetermined period, such as 20 microseconds, to indicate that the pulses which follow relate to temperature information. The five pulses in a typical sequence are illustrated at 24, 26, 28, 30 and 32 in Figure 3 with representative time periods between them. These pulses are transmitted by the transmitter 22.

Just as the channel providing temperature information is activated upon the reception of odd interrogatory pulses from the central station, the channel providing pressure information is activated upon the reception of even pulses. Upon each activation of the encoder 20, the encoder produces a coloring pulse which precedes a second pulse by a predetermined time interval, such as 12 microseconds, to prepare the central station for the fact that the pulses which folow relate to pressure information. The four pulses which follow the coloring pulse are spaced from one another by periods of time proportional to the values of successive digits in the pressure measurement.

The system shown in Figures 1A and 1B is adapted to be used with the system shown in Figure 2. In the embodiment of the invention shown in Figures 1A and 1B, a pulse receiver 34 (Figure 1A) is adapted to receive the pulses from the transmitter 22 (Figure 2). The output side of the receiver 34 is connected to the input side of a blocking oscillator 36 (Figure 1A), the grid of the left tube in a monostable multivibrator 38 and the suppressor grid of the pentode in a gate circuit 40.

The output from the blocking oscillator 36 is connected to the suppressor grids of the pentodes in gate circuits 42 and 44. Connections are made to the control grids of the pentodes in the gate circuits 42 and 44 from the plates of the left tubes in the multivibrator 38 and a multivibrator 46, respectively, the plate of the left tube in the multivibrator 38 also being connected to the grid of the left tube in the multivibrator 46. The plates of the pentodes in the gate circuits 42 and 44 are connected by leads 47 and 48 to the grids of the right and left tubes, respectively, in a bistable multivibrator 49 (Figure 1B) and through rectifiers 50 and 52 (Figure 1A), respectively, to the grid of the left tube in a monostable multivibrator 54. The plate of the left tube in the multivibrator 54 is connected to the control grid of the pentode in the gate circuit 40.

Connections are made by leads 55 from the plate of the pentode in the gate circuit 40 to the grids of the right tubes in bistable multivibrators 56, 58, 60, 62 and 64, shown in duplicate in Figures 1A and 1B. The plates of the left tubes in the bistable multivibrators 56, 58, 60 and 62 are connected to the grids of the left tubes in the multivibrators 58, 60, 62 and 64, respectively. The plates of the left tubes in the bistable multivibrators 58, 60 and 62 are also connected to the input terminals of timing circuits, illustrated in block form at 66.

The plate of the left tube in the multivibrator 64 is connected by a lead 67 to the grid of the left tube in a bistable multivibrator 68 (Figure 1B) and to the suppressor grid of the pentode in a gate circuit 70. The plate of the right tube in the multivibrator 64 is connected to the control grid of the pentode in a gate circuit 72. Connections are made from the plate of the left tube in the multivibrator 68 to the control grid of the pentode in a gate circuit 74 and from the plate of the right tube in the multivibrator 68 to the control grid of the pentode in the gate circuit 70.

An astable blocking oscillator 76 and an amplifier 78 are connected in cascade arrangement to the suppressor grids of the pentodes in the gate circuits 72 and 74 and through a capacitance to the suppressor grid of the pentode in the gate circuit 70. The plates of the pentodes in the gate circuits 72 and 74 are connected to the input terminal of an amplifier 80, the output terminal of which is connected to the control grids of the pentodes in gate circuits 82 and 84. Similarly, connections are made from the plate of the pentode in the gate circuit 70 to the input terminal of an amplifier 86, the output terminal of which is connected to the control grids of the pentodes in gate circuits 88 and 90.

The suppressor grids of the pentodes in the gate circuits 82 and 88 are connected to the plate of the left tube in the bistable multivibrator 49, and the suppressor grids of the pentodes in the gate circuits 84 and 90 are connected to the plate of the right tube in the multivibrator 49. The plates of the pentodes in the gate circuits 82 and 84 are respectively connected to the suppressor grids of the pentodes in gate circuits 92 and 94, and the plates of the pentodes in the gate circuits 88 and 90 are respectively connected to the grids of the left tubes in bistable multivibrators 96 and 98. The plates of the right tubes in the bistable multivibrators 96 and 98 are connected to the control grids of the pentodes in the gate circuits 92 and 94.

The plates of the pentodes in the gate circuits 92 and 94 are respectively connected by leads 100 and 102 (Figures 1A and 1B) to input terminals of counting circuits illustrated at 104 and 106 (Figure 1A). Corresponding input terminals of each counting circuit are also connected to the output terminals of gate circuits illustrated at 108, the input terminals of which are connected to the output terminals of the timing circuits 66. The outputs from the counting circuits 108 are introduced to a typing circuit 110 which controls the operation of a typewriter (not shown).

In addition to being connected to the gate circuits 92 and 94, the input terminals of the counting circuits 104 and 106 are also connected through rectifiers 112 and 114, respectively, to the plate of the right tube in a monostable multivibrator 116. The grid of the left tube in the multivibrator 116 is connected to the stationary contact of a normally open switch 118, the movable contact of which is grounded.

The pulses from the transmitter 22 are received by the receiver 34 and are introduced to the monostable multivibrator 38 (Figure 1A), the left tube of which is normally conducting. The left tube in the multivibrator becomes cut off upon the introduction of the first pulse 26 in each sequence and remains cut off for a predetermined period of time. For example, the left tube in the multivibrator 38 may be cut off for approximately 15 microseconds. When the left tube in the multivibrator 38 again starts to conduct, the left tube in the multivibrator 46 becomes cut off for a predetermined period of time, such as 10 microseconds.

During the time that the left tubes in the multivibrators 38 and 46 are cut off, the gate circuits 42 and 44 respectively pass the signals from the receiver 34, the signals having been first amplified and inverted by the oscillator 36. Thus, the gate circuit 42 passes the first two pulses in the pressure sequence but only the first pulse in the temperature sequence since its activation period of 15 microseconds coincides with the 12 microsecond period between the first and second pulses in the pressure sequence but not with the 20 microsecond period between the first two pulses in the temperature sequence. Similarly, because of its coincidence with the positive pulse from the multivibrator 46, the second pulse in the temperature sequence passes through the gate circuit 42, but the second pulse in the pressure sequence does not coincide with the positive pulse from the multivibrator 46.

As disclosed above, the first pulse 24 in each sequence passes through the gate circuits 42 and 44. This pulse causes the left tube in the monostable multivibrator 54 to become cut off for a predetermined period of time, such that a positive pulse is formed on the plate of the left tube during the reception of all of the pulses in a pulse sequence. The parameters of the multivibrator 54 are further chosen to provide a slight delay, after the introduction of the first pulse in each sequence, before the positive pulse on the plate of the left multivibrator tube reaches its maximum value. This slight delay prevents the first pulse in each sequence from passing through the gate circuit 40, since the pentode in the gate circuit is biased to pass the received pulses only when the pulse from the multivibrator 54 has a maximum value.

Upon the introduction of the second pulse 26 in each sequence, the right tube in the multivibrator 56 becomes cut off. Since the plate of one tube is connected to the grid of the other tube in each multivibrator, the rise in voltage on the plate of the right tube in the multivibrator 56 when the tube becomes cut off causes the voltage on the grid of the left tube to rise sufficiently for the tube to start conducting. The resultant negative pulse on the plate of the left tube in the multivibrator 56 causes the normally conducive left tube of the multivibrator 58 to become cut off and the right tube in the multivibrator 58 to start conducting. The right tube in the multivibrator 58 then conducts until the introduction of the third pulse 28 in each received sequence, and during this time the left tube in the multivibrator remains cut off. Similarly, the left tube in the multivibrator 60 is cut off only between the third pulse 28 and the fourth pulse 30, and the left tube in the multivibrator 62 is cut off only between the fourth pulse 30 and the fifth pulse 32. Thus, each multivibrator is activated during the period between a different pair of sequentially received pulses so as to effectively separate into different channels the information representing each digit in a measurement.

During the time that the left tubes in each of the multivibrators 58, 60 and 62 are cut off, the timing circuits 66 are activated to produce signals at predetermined intervals. For example, with an interval of 30 microseconds representing an integer in each digital value, five signals may be produced by the timing circuits 66 at equal intervals during a 150 microsecond period between the pulses 26 and 28 to indicate that the value of the first digit in the measurement is actually "5." The signals produced by the timing circuits 66 between each pair of successive pulses are channelized by the gate circuits 108 and introduced into separate counting circuits 104 and 106, the circuits 104 receiving the pressure indications and the circuits 106 receiving the temperature indications. After a complete set of information has been received in all of the temperature and pressure channels, the typing circuit 110 is operated to record in sequence the values of the different digits in each measurement. The operation of the timing circuits 66, the gate circuits 108, the counting circuits 104 and 106, and the typing circuit 110, is fully described in co-pending application Serial No. 212,108, filed February 21, 1951, by Alexander Greenfield.

In case the signals from the transmitter 22 are considerably attenuated because of the distance between the transmitter and the receiver 34, less than the predetermined number of signals may be received. In that case, the left tube of the multivibrator 64 continues to conduct and the right tube remains cut off. The resultant positive pulse on the plate of the right tube in the multivibrator 64 causes the voltage on the control grid of the pentode in the gate circuit 72 (Figure 1B) to be positive.

Some time after the last signal in the sequence has been received, the astable blocking oscillator 76 produces a pulse which serves as the interrogatory pulse sent out from the transmitter. As previously disclosed, the interrogatory pulses are transmitted at a predetermined frequency to activate the encoders 14 and 20 for the alternate transmission of temperature and pressure information. The pulse from the blocking oscillator 76 also triggers all of the multivibrators shown in Figures 1A and 1B after a suitable delay for the operation of the system shown in Figures 1A and 1B. Triggering the multivibrators returns them to a proper condition for operation on the next sequence of pulses received at the ground station. When the interrogatory pulse is produced, it appears on the suppressor grid of the pentode in the gate circuit 72. If the control grid of the pentode is also positive as a result of the reception of less than five pulses, the signal from the blocking oscillator 76 passes through the gate circuit 72 and the amplifier 80 and appears on the control grids of the pentodes in the gate circuits 82 and 84.

The suppressor grids of the pentodes in the gate circuits 82 and 84 alternately become positive, depending upon whether pressure or temperature information is being received. If less than five signals in a pressure sequence is received, the signal from the gate circuit 72 passes through the gate circuit 82 and appears on the suppressor grid of the pentode in the gate circuit 92. Since the voltage on the control grid of the pentode in the gate circuit 92 is positive because of the normally cut-off condition of the right tube in the multivibrator 96, the signal from the gate circuit 82 passes through the gate circuit 92. The signal is then introduced to the counting circuits 104 (Figure 1A) to blank out the pressure information provided by the pulse sequence. By such elimination of all pressure information from the counting circuits, no record of pressure information is provided until a pulse sequence with at least a minimum number of pulses is received. Similarly, if less than five pulses in a temperature sequence is received, the signal from the gate circuit 72 passes through the gate circuits 84 and 94 to blank out the information in the counting circuits 106.

Upon the reception of the fifth pulse in a sequence, the right tube in the multivibrator 62 (Figure 1B) becomes cut off and the left tube starts to conduct. The resultant negative pulse on the plate of the left tube in the multivibrator 62 causes the normally conductive left tube of the multivibrator 64 to become cut off. This tube remains cut off unless an additional pulse is received in the sequence as a result of excessive interference, intentional or inadvertent, from extraneous sources. Upon the reception of more than five pulses in a sequence, the right tube in the multivibrator 64 becomes cut off and the left tube starts to conduct, causing the left tube in the multivibrator 68 to become cut off. The positive pulse produced on the plate of the left tube in the multivibrator 68 in turn causes the signal from the oscillator 76 to pass through the gate circuit 74 to the gate circuits 82 and 84. Depending upon whether the sequence represents temperature or pressure information, a signal is produced in a manner similar to that disclosed above to eliminate the signals in the counting circuits 104 or 106.

The positive pulse produced on the plate of the left tube in the multivibrator 64 upon the reception of the fifth pulse in each sequence is introduced to the suppressor grid of the pentode in the gate circuit 70. If no further pulses are received in the sequence, a positive pulse is also introduced to the control grid of the pentode in the gate circuit 70 from the plate of the right tube in the multivibrator 68. As a result, the interrogatory pulse from the oscillator 76 passes through the gate circuit 70 and the amplifier 86 to the control grids of the pentodes in the gate circuits 88 and 90.

The suppressor grids of the pentodes in the gate circuits 88 and 90 become respectively positive during the reception of pressure and temperature information because of the alternate conduction produced in the two tubes in the multivibrator 48 by the introduction of the first pulse in each sequence to the grids of the two tubes. Thus, with the reception of a correct number of pulses in a pressure sequence, a signal passes through the gate circuit 88 and cuts off the normally conductive left tube in the multivibrator 96. A negative pulse is then produced on the plate of the right tube in the multivibrator to provide a negative bias for preventing any blanking signal from passing through the gate circuit 92 to the counting circuits 104. Similarly, the control grid of the pentode in the gate circuit 94 is biased negatively when a correct number of signals are received in a temperature sequence.

When no blanking signals are introduced to the counting circuits 104 and 106, the typing circuit 110 is operated in accordance with the information stored in the different pressure and temperature channels to provide a sequential recordation of the values of the different digits in each measurement. After the typing operation has been completed, the typewriter carriage (not shown) is returned to its starting position. As the typewriter carriage returns to its original position, the switch 118 closes and causes the normally conductive left tube in the monostable multivibrator 116 to become cut off. At the same time, the right tube in the multivibrator starts to conduct and produces a pulse which blanks out the information in the counting circuits 104 and 106 so that a new set of temperature and pressure information may be recorded after being decoded and introduced into separate channels by the timing circuits 66, the gate circuits 108 and the counting circuits 104 and 106.

Additional circuits may be provided to operate the typewriter for the recordation of such correct information as has been received after a certain number of pulse sequences has been sampled by the system shown in Figures 1A and 1B. The correct information is recorded after the sampling of the predetermined number of sequences, regardless of whether the correct number of pulses has been received for each of the different conditions which are measured. Each condition is recorded at a predetermined horizontal position on the paper, so that the values which are recorded for each condition at different times can be easily correlated and analyzed by vertically scanning the paper. Recording the information after the reception of a certain number of pulse sequences is especially desirable where a large number of sequences are transmitted in a relatively short time, such as 100 sequences per second, since the information which is not recorded one time will probably be recorded during the next group of sequences. In those cases where time is immaterial and a correct recordation as evidenced by the reception of a correct number of pulses is essential, the system shown in Figures 1A and 1B may be used without any additional circuits to sample the pulse sequences until the correct number of pulses is received in each sequence.

There is thus provided a system for checking the number of pulses received in each sequence at a ground station. If the number of pulses is different from a predetermined value, the information represented by the pulses is eliminated before it is recorded and a new sequence of pulses is utilized. When the correct number of pulses is received in the sequence, the system actively operates to prevent the formation of any blanking signal until after the information represented by the pulses has been recorded for subsequent analysis.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination with means for receiving a predetermined number of sequentially transmitted pulses representing the value of a variable quantity, means associated with the receiving means for converting the time period between each pair of adjacent pulses into a plurality of signals proportional to the time period, means associated with the converting means for counting the number of signals produced between each pair of adjacent pulses, and means associated with the counting means for eliminating the signals from the counting means for the initiation of a new count upon reception by the receiving means of a number of pulses other than the predetermined number.

2. In combination with means for receiving a predetermined number of sequentially transmitted pulses representing the value of a variable quantity, means for producing a plurality of information signals during the period of time between each pair of adjacent pulses to indicate the time period, means for introducing a zeroizing signal to the signal producing means for canceling the information signals upon the reception by the receiving means of a plurality of pulses less than the predetermined number, means for introducing a zeroizing signal to the signal producing means for canceling the information signals upon the reception by the receiving means of a plurality of pulses greater than the predetermined number, and means for preventing the formation of any zeroizing signal, upon the reception of the predetermined number of pulses by the receiving means, until after the utilization of the information signals.

3. In combination with means for receiving a predetermined number of sequentially transmitted pulses representing the value of a variable quantity, means connected to the receiving means for converting the time period between each pair of adjacent pulses into a number of information signals indicative of the time period and for counting the number of signals produced during each time period, means for introducing a zeroizing signal to the counting means for elimination of the signals in the counting means upon the reception by the receiving means of a plurality of pulses different from the predetermined number, and means for preventing the introduction of any zeroizing signal upon the reception of the correct number of signals, until after the utilization of the signals in the counting means.

4. In combination with means for receiving a predetermined number of sequentially transmitted pulses representing the value of a variable quantity, means connected to the receiving means for determining the information represented by the time periods between the squentially transmitted pulses, a first gate circuit opened for the passage of a signal upon the reception by the receiving means of a plurality of pulses less than the predetermined number, a second gate circuit opened for the passage of a signal upon the reception by the receiving means of a plurality of pulses greater than the predetermined number, means for producing a signal for the cancellation of the information represented by the spacing between pulses upon the introduction of a signal from the first or second gate circuits, a third gate circuit opened for the passage of a signal upon the reception of a plurality of signals equal to the predetermined number, and means for preventing the operation of the cancelling means upon the introduction of a signal from the third gate circuit.

5. In combination with means for receiving a predetermined number of sequentially transmitted pulses representing the value of a variable quantity, means connected to the receiving means for determining the information represented by the time periods between the sequentially transmitted pulses, a first gate circuit opened for the passage of a signal for blanking out the information represented by the pulses upon the reception by the receiving means of a plurality of pulses different from the predetermined number, a second gate circuit opened for the passage of a signal upon the reception of a plurality of pulses equal to the predetermined number, and means for closing the first gate circuit to the passage of any blanking signal, upon the introduction of a signal from the second gate circuit, until after the utilization of the information represented by the pulses.

6. In combination with means for receiving a predetermined number of sequentially transmitted pulses representing the value of a variable quantity, means for determining the information represented by the time period between the sequentially transmitted pulses, a plurality of multivibrators associated with the receiving means and the information determining means and sequentially operative upon the reception of the transmitted pulses, each multivibrator including a pair of tubes, means connected to a first tube of one of the multivibrators to produce a signal for quenching the pulse information upon the reception by the multivibrators of a plurality of pulses less than the predetermined number, means connected to a first tube of a multivibrator successive to the first mentioned multivibrator to produce a signal for quenching the pulse information upon the reception by the multivibrators of a plurality of pulses greater than the predetermined number, and means connected to the second tube of the first mentioned multivibrator to prevent the formation of any quenching signal upon the reception by the multivibrators of a plurality of pulses equal to the predetermined number until after the utilization of the pulse information.

7. In combination with means for receiving groups of sequentially transmitted pulses, each group representing a different variable quantity, means for channelizing the pulses in each group, means connected to the channelizing means for determining the value of each variable quantity by the time periods between the pulses in the group representing the quantity, means for introducing a signal to the time determining means for the quenching of information indicative of the quantity upon the reception by the receiving means of a plurality of pulses different from the number representative of each variable quantity, and means for preventing the introduction of a signal to the time determining means, upon the reception by the receiving means of a plurality of pulses equal to the number representative of each variable quantity, until after the utilization of any information indicative of the quantity.

8. In combination with means for receiving groups of sequentially transmitted pulses, each group representing a different variable quantity, means for channelizing the pulses in each group, means connected to the channelizing means for converting the periods of time between the pulses in each group into a plurality of signals indicative of the quantity, a circuit for introducing a signal to the converting means for quenching the information indicative of the quantity, means for completing the quenching circuit upon the reception by the receiving means of a plurality of pulses less than the number representative of each variable quantity, means for completing the quenching circuit upon the reception by the receiving means of a plurality of pulses greater than the number representative of each variable quantity, and means for opening the quenching circuit, upon the reception by the receiving means of a plurality of pulses equal to the number representative of each variable quantity, until the utilization of the information represented by the pulses.

9. In combination with means for receiving groups of sequentially transmitted pulses, each group representing a different variable quantity, means for separating into separate channels the information representing each of the variable quantities, a plurality of multivibrators sequentially operative upon the reception of successive pulses in a pulse group, each multivibrator having a pair of tubes, means connected to a first tube of one multivibrator in the sequence to produce a signal for quenching the indication upon the reception of a plurality of pulses less than the number indicative of a variable quantity, means connected to a tube of another multivibrator in the sequence to produce a signal for quenching the indication upon the reception of a plurality of pulses greater than the number indicative of a variable quantity, means for directing the quenching signal to the channels providing an indication of the quantity upon the introduction of the first pulse in the sequence representing the variable quantity, and means connected to the second tube of the first mentioned multivibrator to prevent the production of a quenching signal, upon the reception of a plurality of pulses indicative of a variable quantity, until after the utilization of the information represented by the pulses.

10. In combination with means for receiving groups of sequentially transmitted pulses, each group representing a different variable quantity, means for separating into separate channels the information representing each of the variable quantities and for decoding the information represented by the time periods between the sequentially transmitted pulses, a first gate circuit opened for the passage of a signal upon the reception of a plurality of pulses in a group less than a predetermined number, a second gate circuit opened for the passage of a signal upon the reception of a plurality of pulses in the group greater than the predetermined number, means for producing a signal for the cancellation of the information represented by the spacing between pulses in the group upon the introduction of a signal from the first or second gate circuits, means for directing the cancellation signal to the channels providing an indication of the variable quantity represented by the pulses in the group, a third gate circuit opened for the passage of a signal upon the reception of a plurality of signals equal to the predetermined number, and means for preventing the production of any cancellation signal, upon the introduction of a signal from the third gate circuit, until after the utilization of the information in the channels.

11. In combination with means for receiving groups of sequentially transmitted pulses, each group representing a different variable quantity, means connected to the receiving means for separating into separate channels the information representing each of the variable quantities, a plurality of multivibrators connected to the channelizing means and sequentially operative upon the reception from the channelizing means of successive pulses in a pulse group, each multivibrator having first and second tubes, a first gate circuit connected to the second tube in a first multivibrator in the plurality to open for the passage of a quenching signal upon the reception by the multivibrators of a plurality of pulses in a group less than a predetermined number, a second gate circuit connected to a first tube in a second multivibrator in the plurality to open for the passage of a quenching signal upon the reception by the multivibrators of a plurality of pulses in the group greater than the predetermined number, means associated with the first and second gate circuits for producing a signal for the cancellation of the information represented by the spacing between successive pulses in the group upon the introduction of a signal from one of the gate circuits, means for directing the cancellation signal to the channels providing an indication of the variable quantity represented by the pulses in the group, a third gate circuit connected to the first tube in the first multivibrator and to the second tube in the second multivibrator in the plurality to open for the passage of a signal upon the reception by the multivibrators of a plurality of signals equal to the predetermined number, and means associated with the third gate circuit for preventing the formation of any cancellation signal, upon the introduction of a signal from the third gate circuit, until after the utilization of the information in the channels.

12. In combination with means for receiving groups of sequentially transmitted pulses, means for determining the information represented by the time periods between pairs of successive pulses in each group, a plurality of bistable multivibrators connected between the receiving means and the time determining means and sequentially operative upon the reception from the receiving means of the transmitted pulses in each group, each bistable multivibrator including a normally conductive tube and a normally non-conductive tube, first gate circuits connected to the normally non-conductive tube of one bistable multivibrator in the plurality and to the normally conductive tube of a second bistable multivibrator in the plurality to open for the passage of a blanking signal upon the reception by the bistable multivibrators of a plurality of pulses in a group different from a predetermined number, means operative by the blanking signal to eliminate the information represented by the pulses in the group, a second gate circuit connected to the normally non-conductive tube of the second bistable multivibrator to open for the passage of a signal upon the reception by the bistable multivibrators of a plurality of pulses in a group equal to the predetermined number, and means for closing the first gate circuit against the passage of any blanking signal, upon the introduction of a signal from the second gate circuit, until after utilization of the information represented by the pulses.

13. In combination with means for receiving groups of sequentially transmitted pulses representing the value of a variable quantity, a plurality of bistable multivibrators connected to the receiving means in cascade arrangement to become sequentially operative upon the reception from the receiving means of successive pulses in each group, each bistable multivibrator including first and second tubes, means connected to the bistable multivibrators for determining the information represented by the time periods between pairs of successive pulses in each group a first gate circuit connected to the second tube in a first multivibrator in the plurality to open upon the reception by the bistable multivibrators of a number of signals in a group less than a predetermined number, a second gate circuit connected to the first tube in a second multivibrator in the plurality to open upon the reception by the bistable multivibrators of a number of signals in a group greater than the predetermined number, the second multivibrator being connected to the first multivibrator for operative control by the first multivibrator in the cascade arrangement, means for introducing a blanking signal to the information determining means upon the opening of the first and second gate circuits to blank out any information, a third gate connected to the first tube in the first multivibrator and to the second tube in the second multivibrator to open upon the reception of the bistable multivibrators of the predetermined number of signals in a group, and a multivibrator connected to the third gate circuit to produce a signal upon the opening of the gate circuit for blocking the utilization of the blanking signal until after the utilization of the information represented by the group of pulses.

14. In combination with means for receiving groups of sequentially transmitted pulses, each group having a predetermined number of pulses and representing the value of a variable quantity, a plurality of multivibrators connected to the receiving means and arranged in cascade relationship to become activated in sequence upon the introduction to the multivibrators of the pulses received by the receiving means, means connected to the multivibrators for converting the time period between each pair of adjacent pulses introduced to the multivibrators into a plurality of signals proportional to the time period, counting means connected to the converting means for counting the signals produced by the converting means to determine the value of the variable quantity, and a circuit connected to the counting means and to the multivibrators for introducing a signal to the counting means, upon a reception by the multivibrator of a number of pulses other than a predetermined number, to blank out the production of signals by the counting means and to provide for the initiation of a new count by the counting means.

References Cited in the file of this patent

UNITED STATES PATENTS

| | | |
|---|---|---|
| 2,443,198 | Sallach | June 15, 1948 |
| 2,468,703 | Hammel | Apr. 26, 1949 |
| 2,537,056 | Hoeppner | Jan. 9, 1951 |
| 2,592,737 | Reynolds | Apr. 15, 1952 |
| 2,603,715 | Vaughan | July 15, 1952 |